(12) United States Patent
Alexander et al.

(10) Patent No.: US 11,515,591 B2
(45) Date of Patent: Nov. 29, 2022

(54) HEAT TRANSFER PANEL HAVING NON-PLANAR INTERNAL CHANNELS WITH SINGLE PLANAR JOINT

(71) Applicant: ThermAvant Technologies, LLC, Columbia, MO (US)

(72) Inventors: Benjamin Alexander, Columbia, MO (US); Dan Pounds, Columbia, MO (US)

(73) Assignee: ThermAvant Technologies, LLC, Columbia, MO (US)

( * ) Notice: Subject to any disclaimer, the term of this patent is extended or adjusted under 35 U.S.C. 154(b) by 259 days.

(21) Appl. No.: 17/072,499

(22) Filed: Oct. 16, 2020

(65) Prior Publication Data

US 2022/0123388 A1  Apr. 21, 2022

(51) Int. Cl.
*H01M 10/6556* (2014.01)
*F28D 15/02* (2006.01)
*H01M 10/613* (2014.01)
*H01M 10/6552* (2014.01)
*H01M 10/6554* (2014.01)
*H01M 10/643* (2014.01)

(52) U.S. Cl.
CPC .... *H01M 10/6556* (2015.04); *F28D 15/0233* (2013.01); *F28D 15/0275* (2013.01); *H01M 10/613* (2015.04); *H01M 10/6552* (2015.04); *H01M 10/6554* (2015.04); *H01M 10/643* (2015.04)

(58) Field of Classification Search
None
See application file for complete search history.

(56) References Cited

U.S. PATENT DOCUMENTS

| | | | |
|---|---|---|---|
| 7,273,517 B1 | 9/2007 | Lweis et al. | |
| 8,919,426 B2 * | 12/2014 | Hardesty | F28D 15/0233 165/104.21 |
| 9,750,160 B2 | 8/2017 | Short, Jr. et al. | |
| 2002/0177238 A1 | 11/2002 | Karp et al. | |

(Continued)

FOREIGN PATENT DOCUMENTS

| | | | |
|---|---|---|---|
| CN | 102729291 A | * | 10/2012 |
| CN | 206177108 U | * | 5/2017 |
| CN | 206177110 U | * | 5/2017 |

*Primary Examiner* — Jonathan Crepeau
(74) *Attorney, Agent, or Firm* — Sandberg Phoenix & von Gontard PC

(57) ABSTRACT

A heat rejection panel comprising a first and a second plate. The first plate comprises an oscillating heat pipe face having a plurality of first opened elongated recesses formed therein, and the second plate comprises an oscillating heat pipe face having a plurality of second open elongated recesses formed therein. The first plate oscillating heat pipe face is hermetically sealed to the second plate oscillating heat pipe face forming a bond joint therebetween. The first plate caps the second open elongated recesses and the second plate caps the first open elongated recesses such that first open elongated recesses are physically and fluidly connected to the second open elongated recesses, thereby forming at least one non-planar oscillating heat pipe channel within the panel that reciprocates back and forth across the bond joint having the bond joint as a longitudinal axis.

15 Claims, 6 Drawing Sheets

(56) References Cited

U.S. PATENT DOCUMENTS

2010/0104938 A1* 4/2010 Hermann ............ H01M 50/293
                                                    429/120
2019/0148681 A1* 5/2019 Park ..................... H01M 50/20
                                                    429/120
2020/0309466 A1* 10/2020 Mayberry ................ B22F 5/10

* cited by examiner

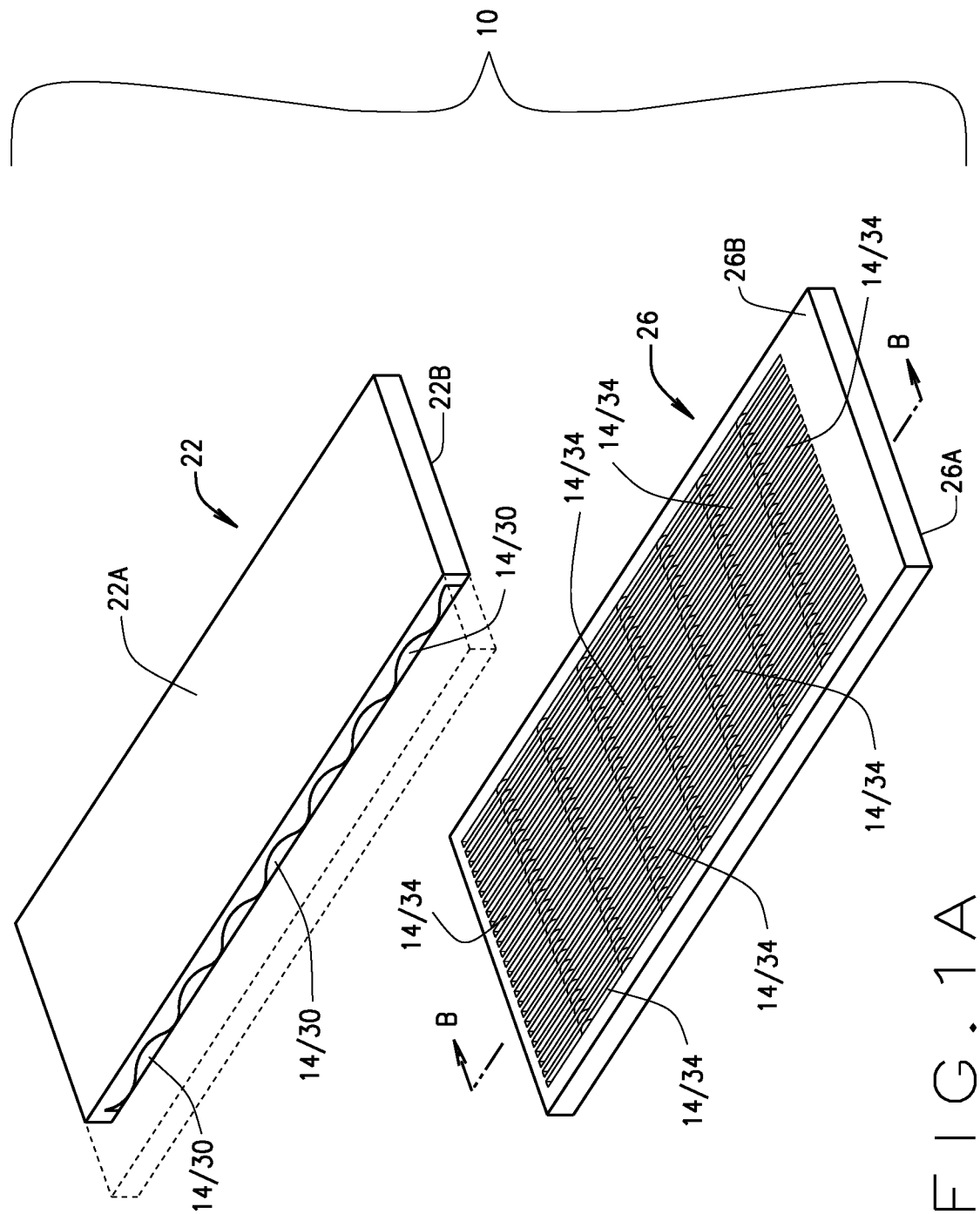

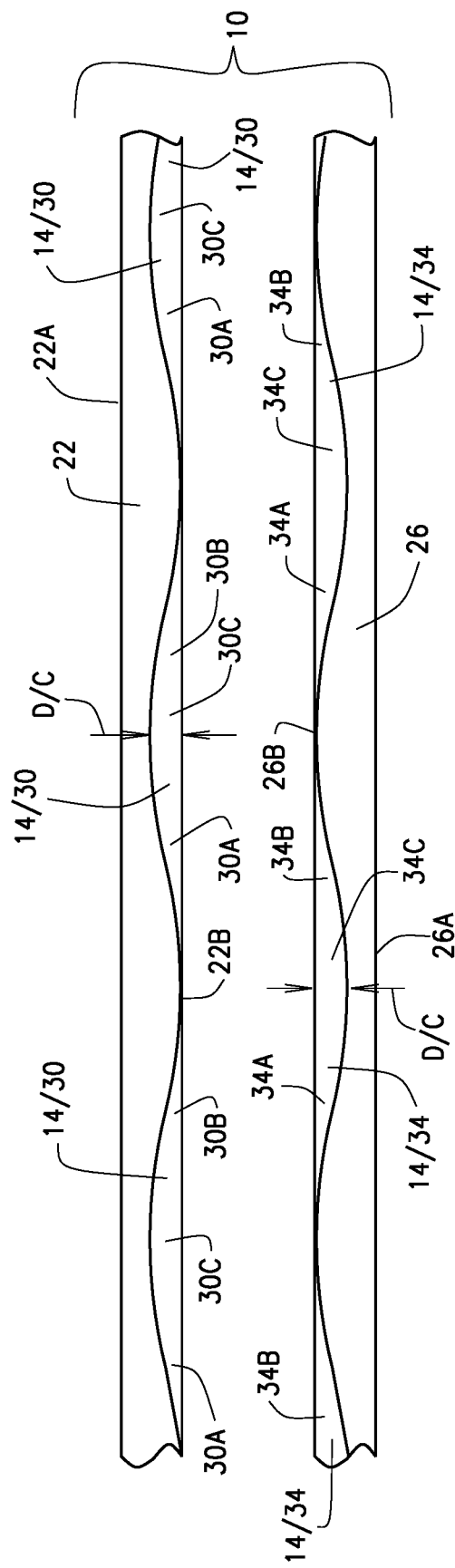
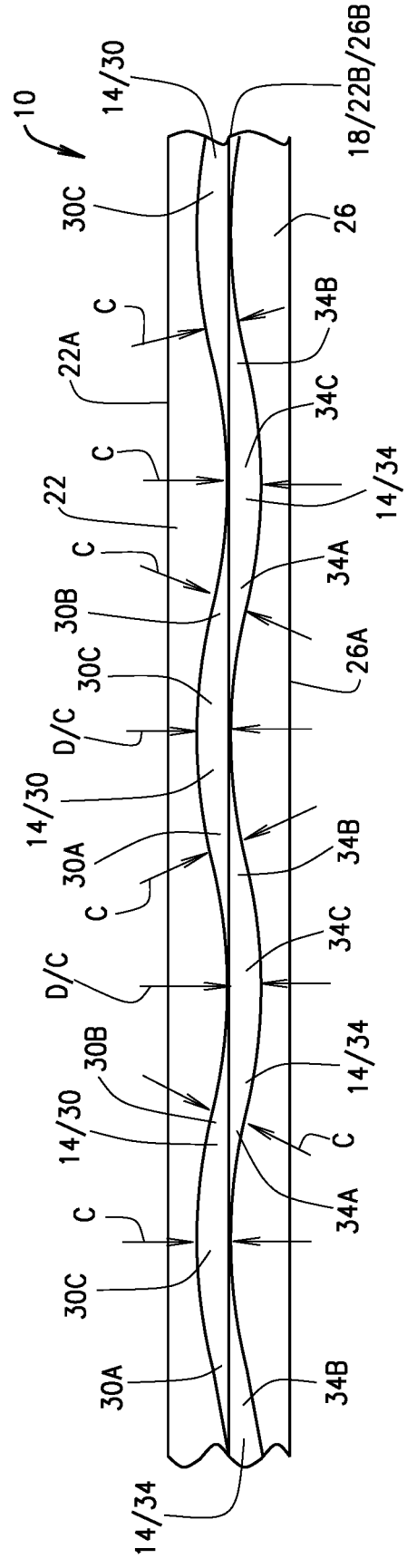
FIG. 1C
FIG. 1B

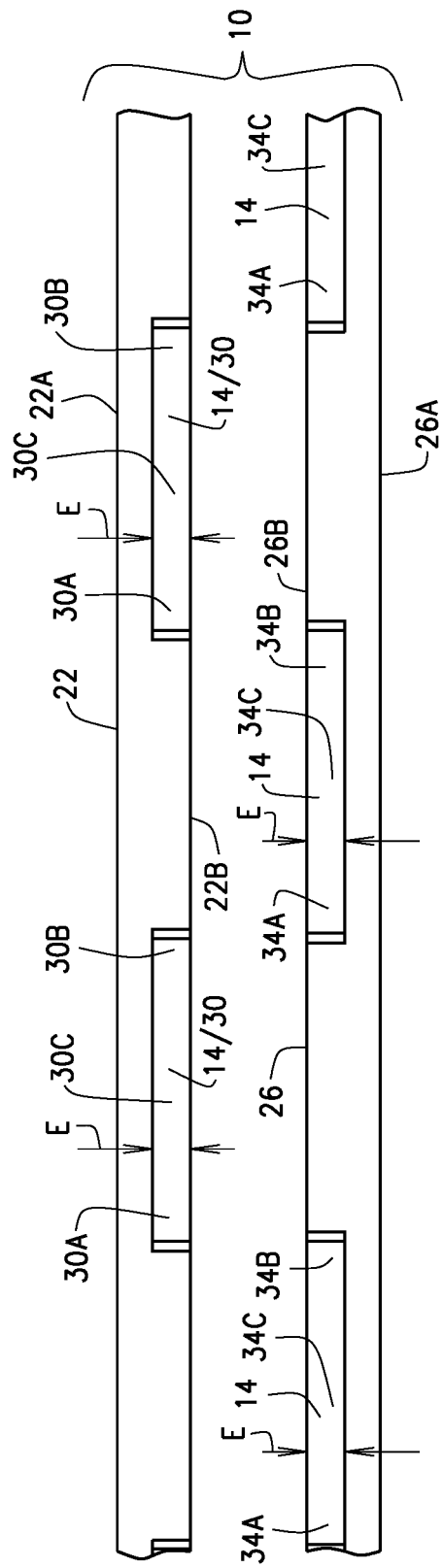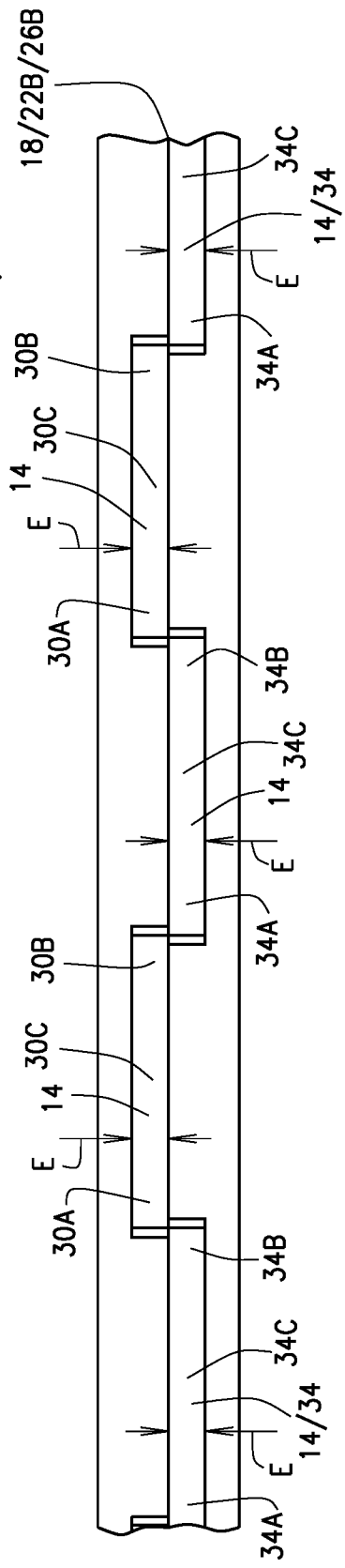

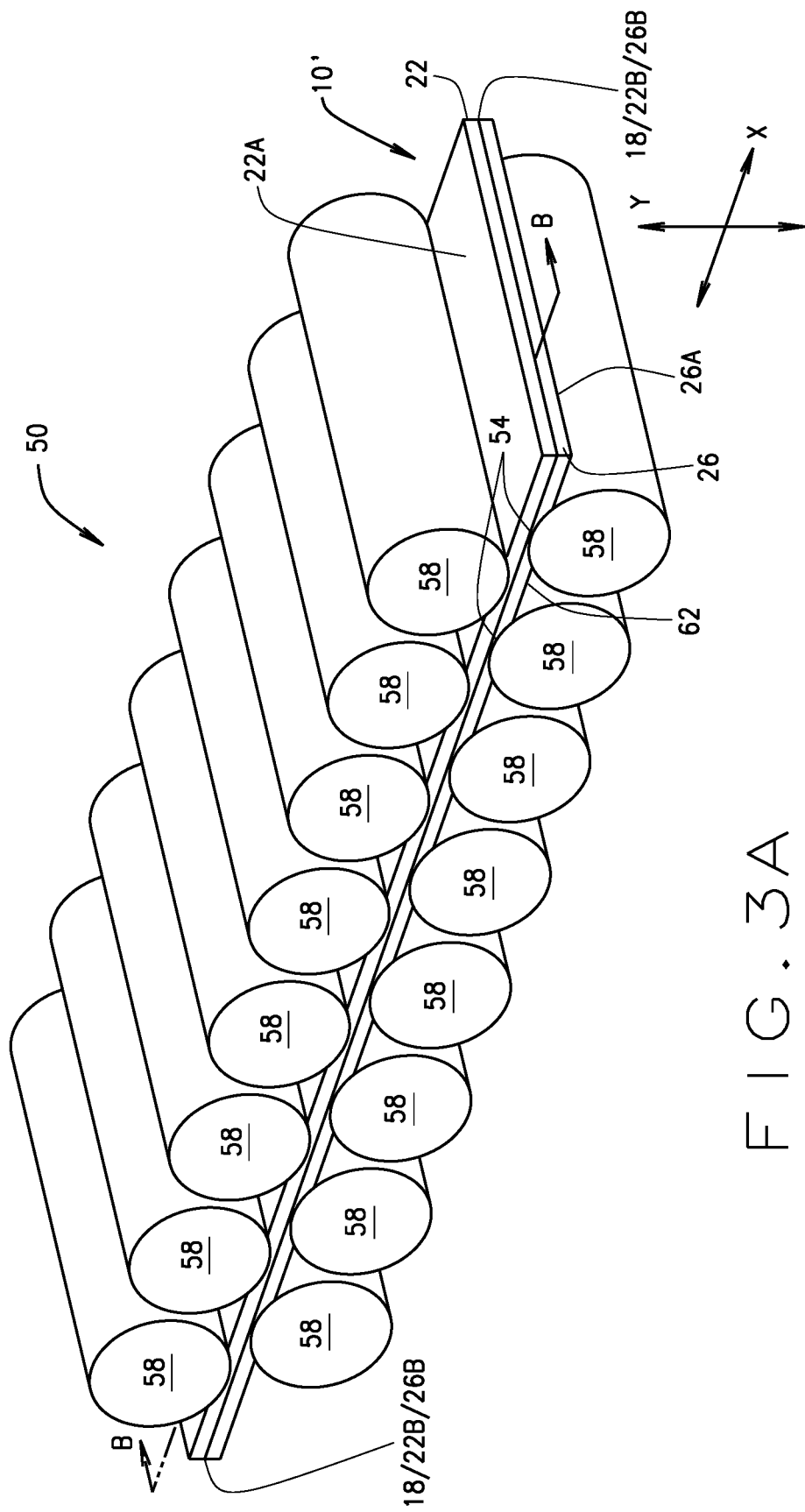

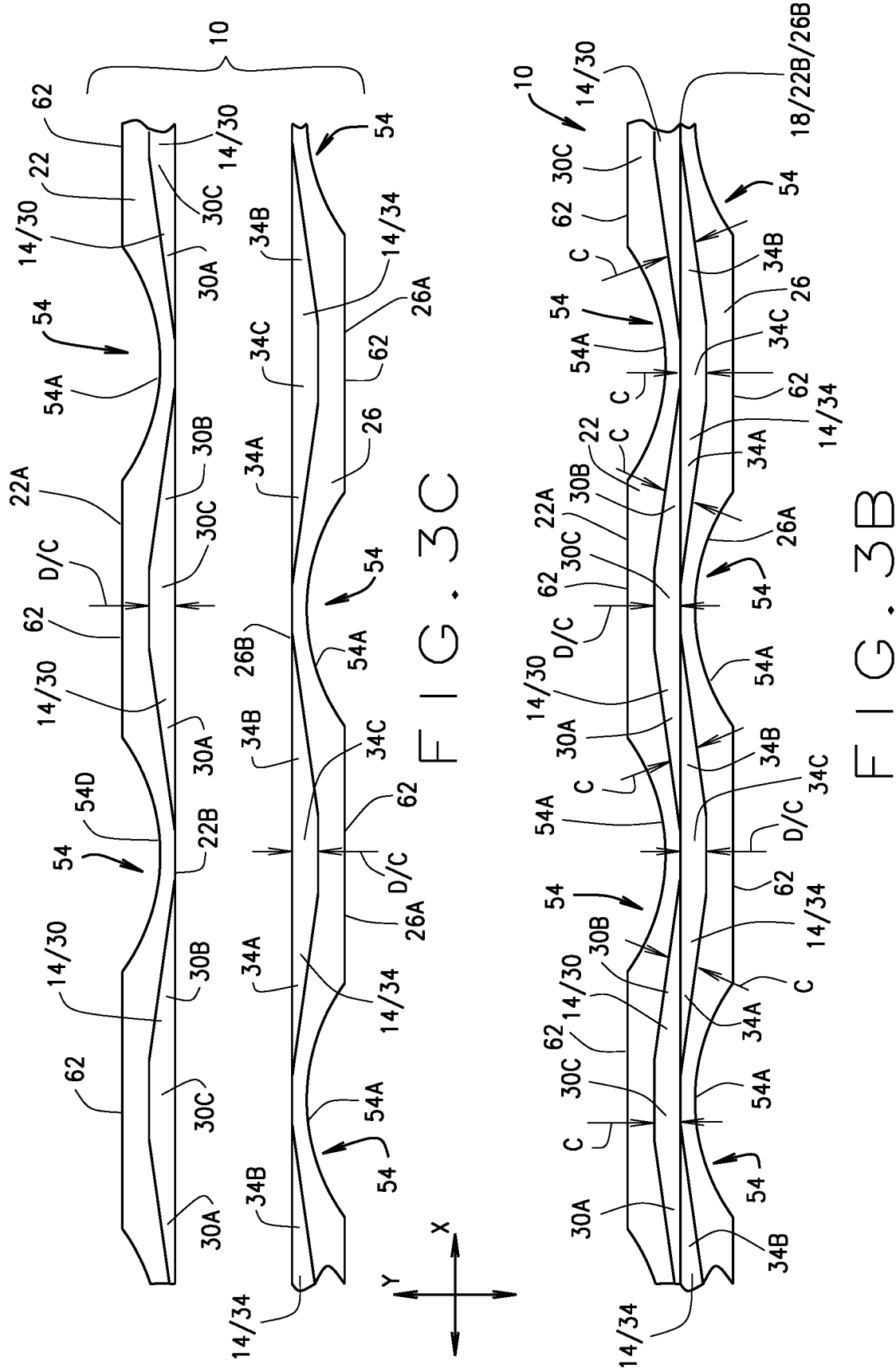

HEAT TRANSFER PANEL HAVING NON-PLANAR INTERNAL CHANNELS WITH SINGLE PLANAR JOINT

FIELD

The present teachings relate to energy cell packs, and more particularly to a cooling thermal buss for an energy cell pack.

BACKGROUND

The statements in this section merely provide background information related to the present disclosure and may not constitute prior art.

Electrical energy storage devices (e.g., lithium ion cells/batteries and battery packs) are consistently becoming more and more prevalent as energy source for a plethora of devices and machines (e.g., computers, cell phones, passenger vehicles, etc.). Additionally, the power requirements of such energy storage devices/packs are ever increasing, while the space envelope requirements are ever decreasing. This increase in use and power demand and decrease in space envelope creates significant challenges in cooling the cells/packs to maintain safe operation, optimal energy storage and delivery, and maximum life of the cells/packs. Therefore, energy storage coolers are often implemented to remove heat from such energy storage devices/packs. For example, when energy storage devices are packed together to form a cell pack, the cell packs often include one or more thermal buss between rows of cells to transfer heat from the cells to some external heat sink. This allows the temperature differential between cells in the pack to be reduced. A competing requirement to the implementation of thermal busses in cell packs is the packing density requirements of the cell packs. Often space and weight are primary design drivers, and the presence of a thermal buss located between cells fundamentally limits the degree to which the packing density can be optimized. Hence, a considerable problem presented by such cell packs is the maximizing of the packing density (or packing fraction) in a packed group of cylinders that includes one or more thermal buss (e.g., Li-ion battery packs) without negatively impacting weight or thermal performance.

Various attempts have been made to address this packing fraction maximization issue but have not been successful. For example, one approach often used is to use a simple solid part to transfer heat from the cells to the heat sink. This approach is thermally limited by the conductivity of the material used and the space available between the cells. These components often end up being relatively heavy to provide sufficient conductance. Another approach involves using a composite material containing a layer of high thermal conductivity material, such as pyrolytic graphite. However, this approach is again limited by the performance of the materials used and the space available between adjacent rows of cells, and weight can be problematic. In some cases, it is required that there be an uninterrupted planer region between the adjacent cells, significantly limiting the maximum packing density.

SUMMARY

In various embodiments the present disclosure provides a heat rejection panel comprising a first plate and a second plate. The first plate comprises a first plate heat source face structured and operable to have at least one heat source disposed thereon, and a first plate oscillating heat pipe face having a plurality of first opened elongated recesses formed therein. Each first open elongated recess includes a leading end portion, an opposing trailing end portion, and a central portion between the leading and trailing end portions. Similarly, the second plate comprises a second plate heat source face structured and operable to have at least one heat source disposed thereon, and a second plate oscillating heat pipe face having a plurality of second open elongated recesses formed therein. Each second open elongated recess includes a leading end portion, an opposing trailing end portion, and a central portion between the leading and trailing end portions. The first plate oscillating heat pipe face is hermetically sealed to the second plate oscillating heat pipe face forming a braze joint or bond joint (also referred to as a bond line) therebetween such that the leading end portion of each first opened elongated recess is physically and fluidly connected to the trailing end portion of a respective one of the second opened elongated recesses, and the leading end portion of each second opened elongated recess is physically and fluidly connected to the trailing end portion of a respective one of the first opened elongated recesses. Therefore, the first plate caps the plurality of second open elongated recesses and the second plate caps the plurality of first open elongated recesses such that the physically and fluidly connected first open elongated recesses and second open elongated recesses form at least one non-planar oscillating heat pipe channel within the panel that reciprocates back and forth across the bond joint having the bond joint as a longitudinal axis of the at least one oscillating heat pipe channel.

In various other embodiments, the present disclosure provides an energy cell pack thermal buss that comprises a first plate and second plate. The first plate comprises a first plate cell bed face having a plurality of first energy cell beds formed therein with a plurality of first interstitial plateaus formed between the first energy cell beds, and a first plate oscillating heat pipe face having a plurality of first opened elongated recesses formed therein. Each first open elongate recess having a leading end portion, an opposing trailing end portion, and a central portion between the leading and trailing end portions. Similarly, the second plate comprises a second plate cell bed face having a plurality of second energy cell beds formed therein with a plurality of second interstitial plateaus formed between the second energy cell beds, and a second plate oscillating heat pipe face having a plurality of second open elongated recesses formed therein. Each second open elongated recess includes a leading end portion, an opposing trailing end portion, and a central portion between the leading and trailing end portions. The first plate oscillating heat pipe face is hermetically sealed to the second plate oscillating heat pipe face forming a bond joint therebetween such that the leading end portion of each first opened elongated recess is physically and fluidly connected to the trailing end portion of a respective one of the second opened elongated recesses, and the leading end portion of each second opened elongated recess is physically and fluidly connected to the trailing end portion of a respective one of the first opened elongated recesses. Therefore, the first plate caps the plurality of second open elongated recesses and the second plate caps the plurality of first open elongated recesses such that the physically and fluidly connected first open elongated recesses and second open elongated recesses form at least one non-planar oscillating heat pipe channel within the thermal buss that reciprocates back and forth across the bond joint having the bond joint as a longitudinal axis of the at least one oscillating heat pipe channel.

In yet other embodiments the present disclosure provides an energy cell pack comprising a plurality of energy cells and a thermal buss structured and operable to have the energy cells disposed and retained thereon. The thermal buss comprises a first plate and second plate. The first plate comprises a first plate cell bed face having a plurality of first energy cell beds formed therein with a plurality of first interstitial plateaus formed between the first energy cell beds, and a first plate oscillating heat pipe face having a plurality of first opened elongated recesses formed therein. Each first open elongate recess having a leading end portion, an opposing trailing end portion, and a central portion between the leading and trailing end portions. Similarly, the second plate comprises a second plate cell bed face having a plurality of second energy cell beds formed therein with a plurality of second interstitial plateaus formed between the second energy cell beds, and a second plate oscillating heat pipe face having a plurality of second open elongated recesses formed therein. Each second open elongated recess includes a leading end portion, an opposing trailing end portion, and a central portion between the leading and trailing end portions. The first plate oscillating heat pipe face is hermetically sealed to the second plate oscillating heat pipe face forming a bond joint therebetween such that the leading end portion of each first opened elongated recess is physically and fluidly connected to the trailing end portion of a respective one of the second opened elongated recesses, and the leading end portion of each second opened elongated recess is physically and fluidly connected to the trailing end portion of a respective one of the first opened elongated recesses. Therefore, the first plate caps the plurality of second open elongated recesses and the second plate caps the plurality of first open elongated recesses such that the physically and fluidly connected first open elongated recesses and second open elongated recesses form at least one non-planar oscillating heat pipe channel within the thermal buss that reciprocates back and forth across the bond joint having the bond joint as a longitudinal axis of the at least one oscillating heat pipe channel.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

FIG. 1A is an exploded view of an exemplary heat rejection panel comprising a plurality of internal non-planar oscillating heat pipe, in accordance with various embodiments of the present disclosure.

FIG. 1B is an exemplary illustration of a cross-section of a portion of the heat rejection panel shown in FIG. 1A along line B-B illustrating the non-planar, non-linear oscillating heat pipe undulating back-and-forth across a single bond joint of the panel, in accordance with various embodiments of the present disclosure.

FIG. 1C is an exploded view of the cross-section of the portion of the heat rejection panel shown in FIG. 1B, in accordance with various embodiments of the present disclosure.

FIG. 2A is an exemplary illustration of a cross-section of a portion of the heat rejection panel shown in FIG. 1A along line B-B illustrating the non-planar oscillating heat pipe undulating back-and-forth across a single bond joint of the panel, in accordance with various other embodiments of the present disclosure.

FIG. 2B is an exploded view of the cross-section of the portion of the heat rejection panel shown in FIG. 2A, in accordance with various embodiments of the present disclosure.

FIG. 3A is an isometric view of an exemplary energy cell pack incorporating the heat rejection panel shown in FIGS. 1A through 2B as a thermal buss, in accordance with various embodiments of the present disclosure.

FIG. 3B is an exemplary illustration of a cross-section of a portion of the thermal buss shown in FIG. 3A along line B-B illustrating the non-planar, non-linear oscillating heat pipe undulating back-and-forth across a single bond joint of the panel, in accordance with various embodiments of the present disclosure.

FIG. 3C is an exploded view of the cross-section of the portion of the heat rejection panel shown in FIG. 3B, in accordance with various embodiments of the present disclosure.

Corresponding reference numerals indicate corresponding parts throughout the several views of drawings.

DETAILED DESCRIPTION

Figure 1D:
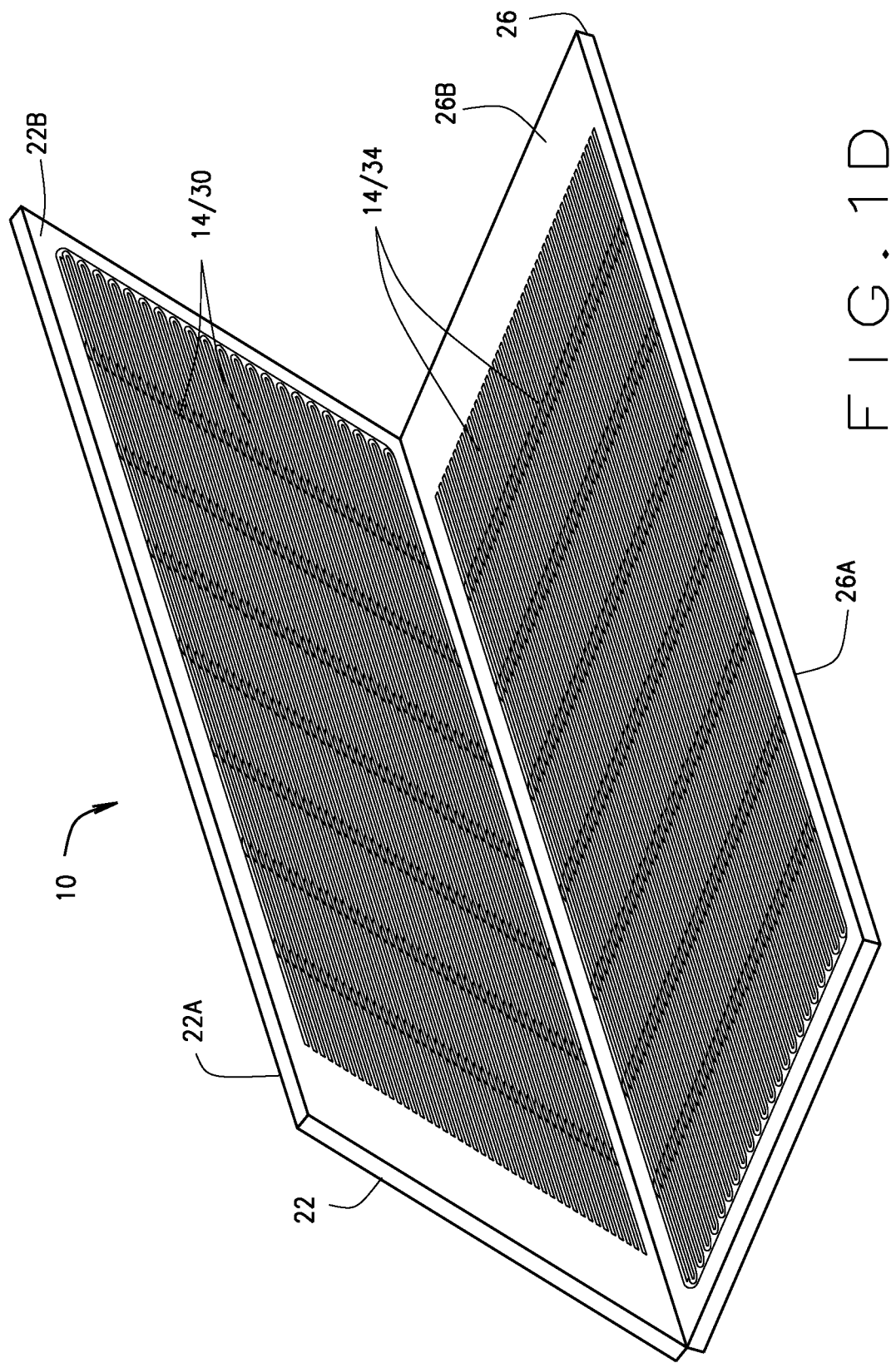
FIG. 1D is an isometric view of the heat rejection panel shown in FIGS. 1A, 1B and 1C illustrating the a plurality of first and second elongated recesses within a respective first and second plate of the panel, in accordance with various embodiments of present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts are causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Referring to FIGS. 1A, 1B, 1C and 1D, the present disclosure generally provides a heat rejection panel 10 (e.g., an energy cell pack thermal buss) that is structured and operable to remove heat from one or more heat generating device (e.g., energy cell(s)) disposed on and in thermal contact with the panel 10 and spread the removed heat across the surface area of panel 10 where the removed heat is rejected to the ambient environment or other suitable heat sink. The panel 10 comprises at least one internal non-planar oscillating heat pipe (OHP) channel 14 that reciprocatingly traverses (e.g., passes back-and-forth across) a single bond joint 18 formed between two plates 22 and 26 of the panel 10. More particularly, the heat rejection panel comprises a first plate 22 and a second plate 26 that are hermetically sealed together along the bond joint 18. The first plate 22 has an external heat source side or face 22A and an internal OHP side or face 22B, and the second plate 26 has an external heat source side or face 26A and an internal OHP side or face 26B. The bond joint 18 is formed when the first plate internal face 22B is hermetically sealed to or with the second plate internal face 22B.

The first and second plates 22 and 26 can be constructed to have any shape and size and fabricated of any desired high thermal conductance material suitable to meet the technical, structural, thermal, mass, weight and/or other specifications of the respective panel 10 application. For example, in various embodiments, the first and second plates 22 and 26 can be fabricated from aluminum, copper, or other metals as well as ceramics, plastics, or composites. The first and second plates 22 and 26 can be hermetically sealed together using any known or unknown method and/or means for hermetically sealing the first and second plates 22 and 26 plates together. For example, first and second plates 22 and 26 can be vacuum brazing, diffusion bonding, welding, adhering or any other means of hermetically bonding the two surfaces.

The first plate heat source face 22A and the second plate heat source face 26A are structured and operable to have one or more heat source, such as computer chips, energy cells (e.g., batteries), illumination devices, etc., disposed on, embedded in, or otherwise placed in thermal contact with the first and second plate heat source faces 22A 26A. As described above, the internal non-planar oscillating heat pipe (OHP) channel(s) 14 is/are formed within the panel 10 such that the OHP channel(s) 14 passes back-and-forth across the single bond joint 18 in a reciprocating manner. Particularly, one or more first portion(s) of each OHP channel 14 is formed within OHP face 22B of the first plate 22, and one or more second portion(s) of each OHP channel 14 is formed with within the OHP face 26B of the second plate 26 such that when the first plate 22 is hermetically sealed to the second plate 26, the first and second OHP channel portions physically and fluidly connect to form the OHP channel(s) 14 that pass back-and-forth across the single bond joint 18 in a reciprocating manner.

More specifically, the first plate oscillating heat pipe face 22B comprises a plurality of first opened elongated recesses 30 formed therein, and the second plate oscillating heat pipe face 26B comprises a plurality of second opened elongated recesses 34 formed therein. As used herein, the term 'opened' means that each of the first and second opened elongated recesses 30 and 34 is opened and not closed at the respective OHP face 22B and 26B along the entire length of each respective first and second elongated recess 30 and 34. Each first opened elongated recess 30 comprises a leading end portion 30A, an opposing trailing end portion 30B, and a central portion 30C between the leading and trailing end portions 30A and 30B. Similarly, each second opened elongated recess 34 comprises a leading end portion 34A, an opposing trailing end portion 34B, and a central portion 34C between the leading and trailing end portions 34A and 34B.

To form the panel 10, the OHP face 22A of the first plate 22 is hermetically sealed to the OHP face 26A of the second plate 26 forming the bond joint 18 along the plane where the first plate 22 is hermetically sealed to the second plate. That is, the bond joint 18 is the planar joint formed along the hermetically sealed planar interface between the first plate OHP face 22A and the second plate OHP face 26A. Importantly, once the first plate OHP face 22A is hermetically sealed to the second plate OHP face 26A, the leading end portion 30A of each first opened elongated recess 30 is physically and fluidly connected to the trailing end portion 34B of a respective one of the second opened elongated recesses 34, and the leading end portion 34A of each second opened elongated recess 34 is physically and fluidly connected to the trailing end portion 30B of a respective one of the first opened elongated recesses 30. Additionally, when the first plate OHP face 22A is hermetically sealed to the second plate OHP face 26A the first plate 22 closes or caps each of the second plate second open elongated recesses 34 and the second plate 26 closes or caps each of the first plate first open elongated recesses 30. Therefore, when the first plate OHP face 22A is hermetically sealed to the second plate OHP face 26A the first open elongated recesses 30 are physically and fluidly connected to the second open elongated recesses 34, thereby forming the non-planar OHP channel(s) 14 within the panel 10. Moreover, by having a portion of each OHP channel 14 formed within the first plate OHP face 22B and another portion of each OHP channel 14 formed within the second plate OHP face 26B the resulting OHP channel(s) 14 is/are non-planar and non-linear. Additionally, the path of the resulting non-planar and non-linear OHP channel(s) 14 through the plate 10 reciprocate(s) back and forth across the bond joint 18 having the bond joint 18 as a longitudinal axis.

In various embodiments, the reciprocating non-planar, non-linear OHP channel(s) 14 can have an equal number of portions formed within the first plate OHP face 22B as formed in the second plate OHP face 26B non-equal portions of same length. In various embodiments, the reciprocating non-planar, non-linear OHP channel(s) 14 can have an unequal number of portions formed within the first plate OHP face 22B as formed in the second plate OHP face 26B non-equal portions of same length. In various embodiments, the portions of the reciprocating non-planar, non-linear OHP channel(s) 14 formed within the first plate OHP face 22B can have the same shape and/or size as the portions of the OHP channel(s) 14 formed in the second plate OHP face 26B. In various embodiments, the portions of the reciprocating non-planar, non-linear OHP channel(s) 14 formed within the first plate OHP face 22B can have different shapes and/or sizes as the portions of the OHP channel(s) 14 formed in the second plate OHP face 26B. More particularly, although some of the examples described herein involve a symmetrically periodic OHP channel 14 arrangement, the present disclosure can also be used to produce any arbitrary, aperiodic channel pattern and remain within the scope of the present disclosure. Still further, it will be readily understood by one skilled in the art that since the first plate 22 covers or caps the second opened elongated recesses 34, and the second plate 26 covers or caps the first opened elongated recesses 30 when the first plate 22 is hermetically sealed to the second plate 26, the depth of the first and second opened elongated recesses 30 and 34 must be equal to desired diameter of the resulting non-planar, non-linear OHP channel 14 that reciprocated back-and-forth across the bond joint 18.

As exemplarily illustrated in FIGS. 1A, 1B and 1C, in various embodiments the reciprocating non-planar, non-linear OHP channel(s) 14 can undulate back and forth across the bond joint 18 in a wave-like manner. In such embodiments, the central portions 30C and 34C of the first and second elongated recesses 30 and 34 have a greater depth D than the respective leading end portions 30A and 34A and trailing end portions 30B and 34B. That is, the central portions 30C and 34C of the first and second elongated recesses 30 and 34 extend deeper or farther into the respective first and second plate OHP faces 22B and 26B than the respective leading end portions 30A and 34A and trailing end portions 30B and 34B, such that the leading end portions 30A and 34A and the trailing end portions 30B and 34B are shallower than the respective central portions 30C and 34C. Furthermore, in such embodiments, each undulating OHP channel 14 has a substantially constant redial cross-section distance C (e.g., a substantially constant diameter) along an entire length thereof. Since, the first plate 22 closes or caps each of the second plate second open elongated recesses 34 and the second plate 26 closes or caps each of the first plate first open elongated recesses 30, the radial cross-section distance C is equal to the depth D of the central portions 30C and 34C of the first and second elongated recesses 30 and 34. Moreover, as shown in FIG. 1B, the first and second elongated recesses 30 and 34 are formed within the respective first and second plate OHP faces 22B and 26B such that the inclined depth of the leading end portions 30A and 34A mate with the inclined depth of the respective fluidly and physically connected trailing end portions 30B and 34B such that the resulting OHP channel(s) 14 have the substantially constant radial cross-section distance C throughout the entire length of each undulating OHP channel 14. By having a substantially constant radial cross-section distance C throughout the entire length of each undulating OHP channel 14, each undulating OPH channel 14 will have a substantially constant hydraulic diameter through the entire length of each undulating OHP channel 14.

In other exemplary embodiments, as shown in FIGS. 2A and 2B the reciprocating non-planar, non-linear OHP channel(s) 14 can traverse back and forth across the bond joint 18 in an alternating step-like manner. In such embodiments, each of the first and second elongated recesses 30 and 34 have a substantially constant radial cross-section distance and depth E (e.g., a constant diameter) along the entire length of respective first and second elongated recesses 30 and 34. Additionally, in such embodiments, the cross-section and depth E of the first elongated recesses 30 are equal to the cross-section and depth E of the second elongated recesses 34.

Referring now to FIGS. 3A, 3B and 3C, the heat rejection panel 10 described above can be implemented and utilized in any application where efficient removal of heat from one or more heat source is needed. The non-planar, non-linear OHP channel(s) 14 reciprocating back-and-forth across the single bond joint 18 make the heat rejection panel 10 especially useful in applications where there are a plurality of heat source that need to be cooled, but also need to be packed closely together. For example, in various embodiments, the heat rejection panel 10 is ideal for use as a thermal buss (referenced herein as thermal buss 10') of an energy cell pack (e.g., a battery pack) 50. The thermal buss 10' is identical in structure, form and function as the heat rejection panel 10 described above with the addition of a plurality of energy cell beds 54 formed in the first and second plate heat source faces 22A and 26A. The thermal buss 10' provides significantly greater thermal conductivities and heat removal, improved packing density of the energy cells 58, and the reduction of weight of the energy cell pack 50 than known thermal busses.

As described above, in such embodiments, the heat source faces 22A and 26A of the respective first and second plates 22 and 26 comprise a plurality of energy cell beds 54 that are shaped, structured and operable have one of a plurality of energy cells 58 disposed therein. Additionally, the heat source faces 22A and 26A of the respective first and second plates 22 and 26 comprise a plurality of interstitial plateaus 62 formed between the cell beds 54. As one skilled in the art would readily recognize, forming the non-planar, non-linear OHP channel(s) 14 within the thermal buss 10' such that the OHP channel(s) 14 reciprocated back-and-forth across the bond joint 18 as described herein, allows the energy cells 58 (e.g., Li batteries) to be packed closer together in both the X and the Y directions. Particularly, as exemplarily shown in FIG. 3B the OHP channel(s) 14 are formed within the thermal buss 10' such that the first opened elongated recesses 30 are formed within the region of the first plate 22 that forms the interstitial plateaus 62, and that the second opened elongated recesses 34 are formed within the region of the second plate 26 that forms the interstitial plateaus 62. Additionally, the cell beds 54 are formed within the first and second plate heat source sides 22A and 26A such that when the first and second plates 22 and 26 are hermetically sealed together, each cell bed 54 of the first plate 22 is aligned with and positioned opposite a respective one of the interstitial plateaus 62 of the second plate 26, and similarly, each cell bed 54 of the second plate 26 is aligned with and positioned opposite a respective one of the interstitial plateaus 62 of the first plate 26.

Accordingly, since the first and second elongated recesses 30 and 34 are formed withing the interstitial plateau portions of the respective first and second plates 22 and 26, which are aligned with and positioned opposite the cell beds 54 of the opposing first and second plates 22 and 26 when the first and second plates 22 and 26 are hermetically sealed together, the resulting non-planar, non-linear OHP channel(s) 14 pass around the cell beds 54, as illustrated in FIG. 3B. This allows the thickness of the respective first and second plates 22 and 26 between a nadir 54A of each cell bed 54 and the respective OHP face 22B and 26B to be minimized, thereby reduction the thickness and weight of the first and second plates 22 and 26, and thereby reducing the overall thickness and weight of the thermal buss 10'. Moreover, by minimizing the of the thickness of first and second plates 22 and 26 between the nadir 54A of each cell bed 54 and the respective OHP face 22B and 26B, the distance in the X direction between cell beds 54 in the first plate 22 can be minimized, and similarly, the distance in the X direction between cell beds 54 in the second plate 22 can be minimized. Still further, by minimizing the of the thickness of first and second plates 22 and 26 between the nadir 54A of each cell bed 54 and the respective OHP face 22B and 26B, the distance in the Y direction between cell beds 54 in the first plate 22 and the cell beds in the second plate 26 can be minimized. Hence, by allowing the distance in the X and Y direction between all cell beds 54 in the thermal buss 10" the packing density of the energy cells 58 in the cell pack 50 can be maximized.

The first and second opened elongated recesses 30 and 34 can be formed within the respective first and second plate OHP faces 22B and 26B using any desired known or unknow manufacturing method, process or means. For example, the first and second opened elongated recesses 30 and 34 can be stamped or milled within the respective first and second plate OHP faces 22B and 26. For example, in various embodiments it is envisioned that the first and second opened elongated recesses 30 and 34 can be milled within the respective first and second plate OHP faces 22B and 26 using ganged slitting saws. This would be a relatively low-cost, high-speed machining method that can provide the ability to produce first and second opened elongated recesses 30 and 34 having rectangular cross-sections of varying aspect ratios and widths. In other embodiments, the first and second plates, having the respective first and second opened elongated recesses 30 and 34 therein, can be fabricated using a 3D printing method and device The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A heat rejection panel, said panel comprising:
  a first plate, the first plate comprising:
    a first plate heat source face structured and operable to have at least one heat source disposed thereon; and
    a first plate oscillating heat pipe face having a plurality of first opened elongated recesses formed therein, each first open elongate recess having a leading end portion, an opposing trailing end portion, and a central portion between the leading and trailing end portions; and
  a second plate, the second plate comprising
    a second plate heat source face structured and operable to have at least one heat source disposed thereon; and
    a second plate oscillating heat pipe face having a plurality of second open elongated recesses formed therein, each second open elongated recess having a leading end portion, an opposing trailing end portion, and a central portion between the leading and trailing end portions, wherein the first plate oscillating heat pipe face is hermetically sealed to the second plate oscillating heat pipe face forming a bond joint therebetween such that the leading end portion of each first opened elongated recess is physically and fluidly connected to the trailing end portion of a respective one of the second opened elongated recesses, and the leading end portion of each second opened elongated recess is physically and fluidly connected to the trailing end portion of a respective one of the first opened elongated recesses, and such that the first plate caps the plurality of second open elongated recesses and the second plate caps the plurality of first open elongated recesses such that the physically and fluidly connected first open elongated recesses and second open elongated recesses form at least one non-planar oscillating heat pipe channel within the panel that reciprocates back and forth across the bond joint having the bond joint as a longitudinal axis of the at least one oscillating heat pipe channel.

2. The panel of claim 1, wherein the at least one oscillating heat pipe channel within the panel undulates back and forth across the bond joint.

3. The panel of claim 2 wherein the central portion of each of the first and second open elongated recesses is deeper than the respective leading and trailing end portions.

4. The panel of claim 3, wherein the at least one oscillating heat pipe channel has a substantially constant radial cross-section along an entire length thereof.

5. The panel of claim 1, wherein the at least one oscillating heat pipe channel within the panel traverses back and forth across the bond joint in an alternating step-like manner.

6. An energy cell pack thermal buss, said buss comprising:
a first plate, the first plate comprising:
a first plate cell bed face having a plurality of first energy cell beds formed therein with a plurality of first interstitial plateaus formed between the first energy cell beds; and
a first plate oscillating heat pipe face having a plurality of first opened elongated recesses formed therein, each first open elongate recess having a leading end portion, an opposing trailing end portion, and a central portion between the leading and trailing end portions; and
a second plate, the second plate comprising
a second plate cell bed face having a plurality of second energy cell beds formed therein with a plurality of second interstitial plateaus formed between the second energy cell beds; and
a second plate oscillating heat pipe face having a plurality of second open elongated recesses formed therein, each second open elongated recess having a leading end portion, an opposing trailing end portion, and a central portion between the leading and trailing end portions, wherein the first plate oscillating heat pipe face is hermetically sealed to the second plate oscillating heat pipe face forming a bond joint therebetween such that the leading end portion of each first opened elongated recess is physically and fluidly connected to the trailing end portion of a respective one of the second opened elongated recesses, and the leading end portion of each second opened elongated recess is physically and fluidly connected to the trailing end portion of a respective one of the first opened elongated recesses, and such that the first plate caps the plurality of second open elongated recesses and the second plate caps the plurality of first open elongated recesses such that the physically and fluidly connected first open elongated recesses and second open elongated recesses form at least one non-planar oscillating heat pipe channel within the buss that reciprocates back and forth across the bond joint having the bond joint as a longitudinal axis of the at least one oscillating heat pipe channel.

7. The buss of claim 6, wherein the at least one oscillating heat pipe channel within the buss undulates back and forth across the bond joint.

8. The buss of claim 7, wherein the central portion of each of the first and second open elongated recesses is deeper than the respective leading and trailing end portions.

9. The buss of claim 8, wherein the at least one oscillating heat pipe channel has a substantially constant radial cross-section along an entire length thereof.

10. The buss of claim 6, wherein the at least one oscillating heat pipe channel within the panel traverses back and forth across the bond joint in an alternating step-like manner.

11. An energy cell pack, said cell pack comprising:
a plurality of energy cells; and
a thermal buss structured and operable to have the energy cells disposed and retained thereon, said buss comprising:
a first plate, the first plate comprising:
a first plate cell bed face having a plurality of first energy cell beds formed therein with a plurality of first interstitial plateaus formed between the first energy cell beds, a respective one of the energy cells disposed within each first cell beds; and
a first plate oscillating heat pipe face having a plurality of first opened elongated recesses formed therein, each first open elongate recess having a leading end portion, an opposing trailing end portion, and a central portion between the leading and trailing end portions; and
a second plate, the second plate comprising
a second plate cell bed face having a plurality of second energy cell beds formed therein with a plurality of second interstitial plateaus formed between the second energy cell beds, a respective one of the energy cells disposed within each second cell beds; and
a second plate oscillating heat pipe face having a plurality of second open elongated recesses formed therein, each second open elongated recess having a leading end portion, an opposing trailing end portion, and a central portion between the leading and trailing end portions, wherein the first plate oscillating heat pipe face is hermetically sealed to the second plate oscillating heat pipe face forming a bond joint therebetween such that the leading end portion of each first opened elongated recess is physically and fluidly connected to the trailing end portion of a respective one of the second opened elongated recesses, and the leading end portion of each second opened elongated recess is physically and fluidly connected to the trailing end portion of a respective one of the first opened elongated recesses, and such that the first plate caps the plurality of second open elongated recesses and the second plate caps the plurality of first open elongated recesses such that the physically and fluidly connected first open elongated recesses and second open elongated recesses form at least one non-planar oscillating heat pipe channel within the buss that reciprocates back and forth across the bond joint having the bond joint as a longitudinal axis of the at least one oscillating heat pipe channel.

12. The cell pack of claim 11, wherein the at least one oscillating heat pipe channel within the buss undulates back and forth across the bond joint.

13. The cell pack of claim 12, wherein the central portion of each of the first and second open elongated recesses is deeper than the respective leading and trailing end portions.

14. The cell pack of claim 13, wherein the at least one oscillating heat pipe channel has a substantially constant radial cross-section along an entire length thereof.

15. The cell pack of claim 11, wherein the at least one oscillating heat pipe channel within the panel traverses back and forth across the bond joint in an alternating step-like manner.

\* \* \* \* \*